G. CONSTANTINESCO.
STORAGE AND UTILIZATION OF ENERGY BY MEANS OF LIQUIDS.
APPLICATION FILED NOV. 22, 1916.

1,334,281.

Patented Mar. 23, 1920.
4 SHEETS—SHEET 1.

Inventor
Gogu Constantinesco
by Axel V. Beeken
Attorney

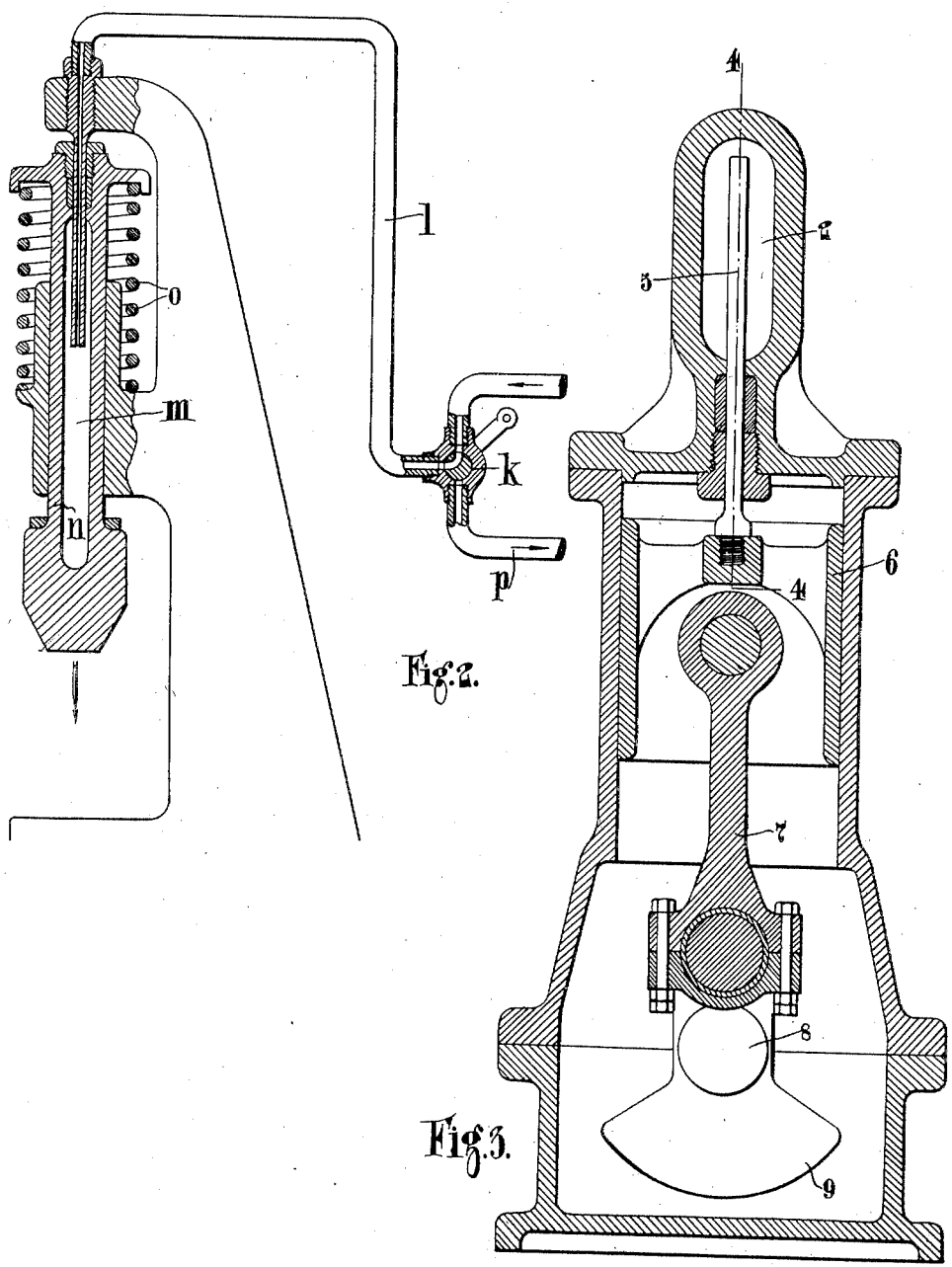

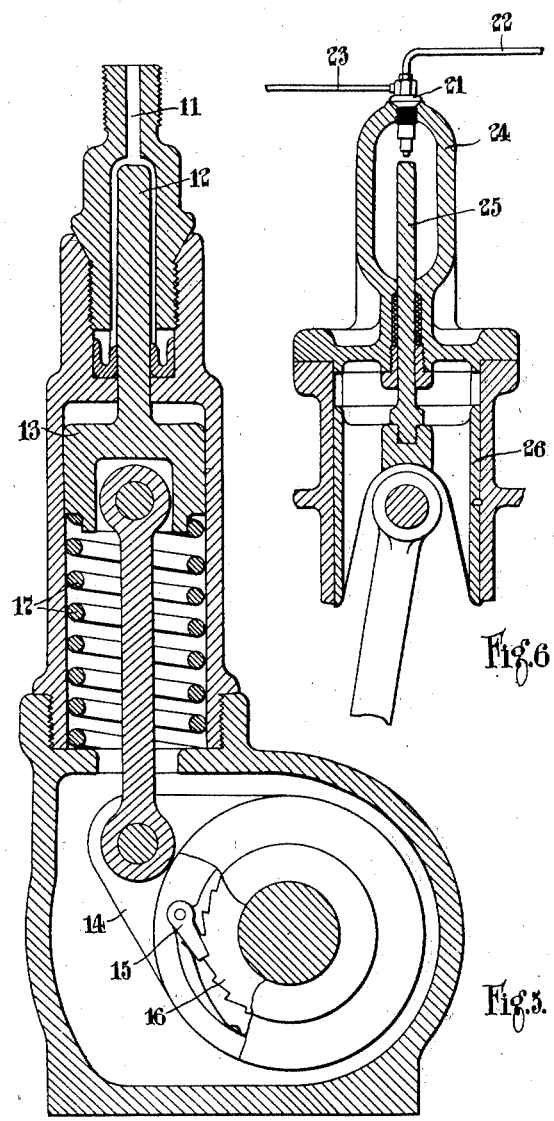

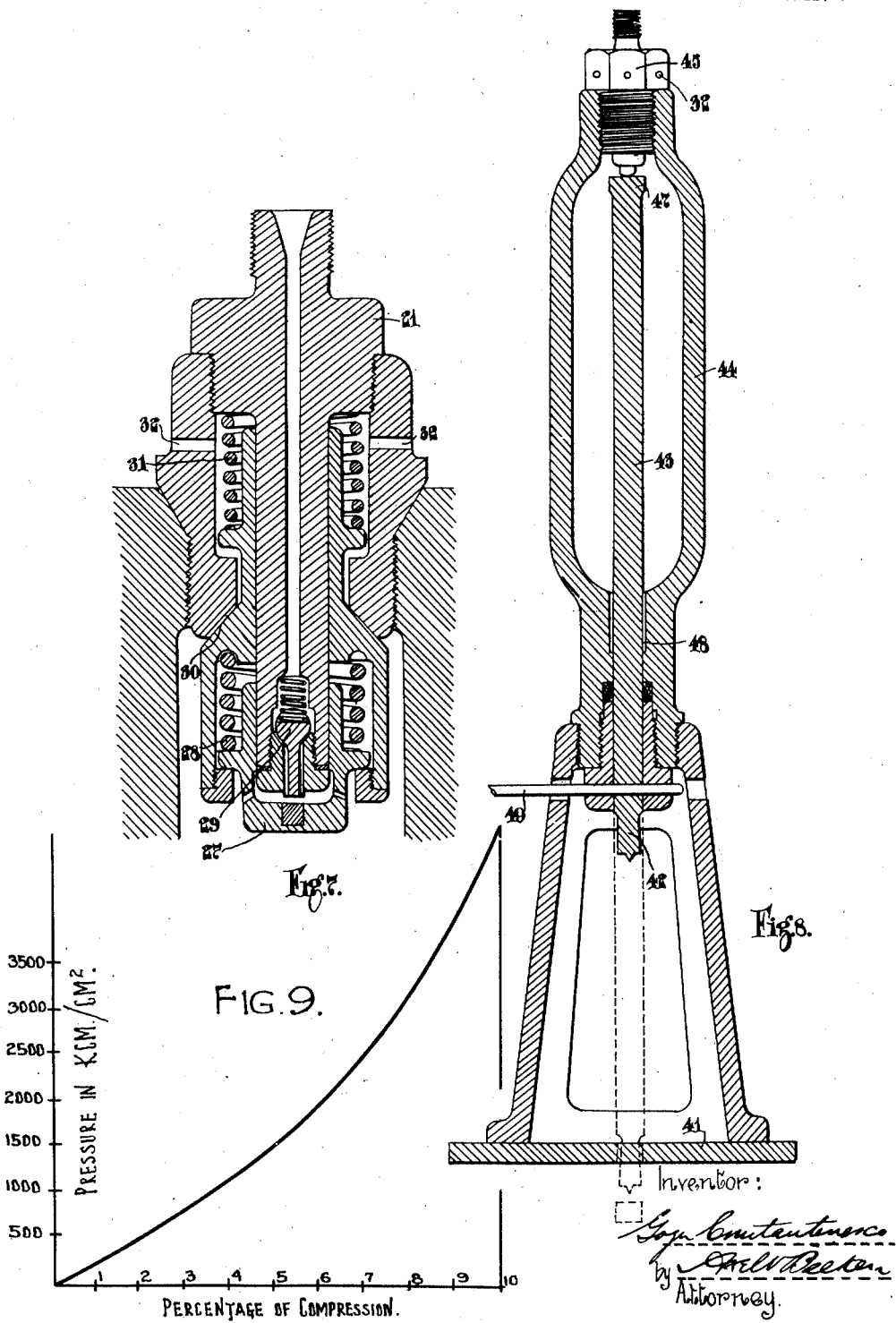

UNITED STATES PATENT OFFICE.

GOGU CONSTANTINESCO, OF ALPERTON, ENGLAND, ASSIGNOR OF ONE-HALF TO WALTER HADDON, OF LONDON, ENGLAND.

STORAGE AND UTILIZATION OF ENERGY BY MEANS OF LIQUIDS.

1,334,281.     Specification of Letters Patent.     Patented Mar. 23, 1920.

Application filed November 22, 1916. Serial No. 132,770.

*To all whom it may concern:*

Be it known that I, GOGU CONSTANTINESCO, a subject of the King of Roumania, and resident of The Haddon Engineering Works, Honeypot Lane, Alperton, in the county of Middlesex, England, have invented certain new and useful Improvements in the Storage and Utilization of Energy by Means of Liquids, of which the following is a specification.

The present invention relates to a method and means for storing and utilizing energy by means of liquids.

In devices for storing energy in liquids heretofore employed, especially water, the energy has been accumulated by pumping the water to a higher level against the action of gravity, or in pumping the water in such a way that it raises weights, thus accumulating potential energy in the weights, which can be utilized by allowing the water to flow, and allowing the weights to descend. Liquids have also been used in accumulators in combination with air cushions.

According to the present invention, liquids are used for the storage of energy, making use not of gravity but of the elasticity of the liquids themselves.

The invention consists in storing energy by the change of volume of liquids under pressure.

The invention further consists in the application of energy stored in elastic liquids under pressure, hereinafter called elastic energy, to the actuation of percussive machines by converting the elastic energy into kinetic energy.

The invention further consists in pumping the liquid into a strong vessel of considerable relative volume, so that it is compressed and undergoes a reduction of volume, and in utilizing the energy of the compressed liquid during its expansion to its initial volume.

The invention further consists in apparatus for utilizing the elasticity of liquids, comprising a pump for compressing the liquid, a vessel into which the liquid is compressed and one or more utilizers of energy which can be worked independently or together from such vessel, The invention also consists in the improved means for storing energy in liquids and utilizing such energy hereinafter described.

As it is known that water and other liquids are compressible, it will be obvious that such liquids, if subjected to a pressure, must undergo a decrease in volume, and on removal of the pressure must necessarily expand to their initial volume; and in all devices heretofore employed in which liquids are subjected to varying pressure diminution and increase of volume of the liquid itself must necessarily take place.

Heretofore, however, the increase in volume of the liquid during its expansion has not been applied to the performance of useful work.

Referring to the accompanying drawings:—

Fig. 2 is a section showing a forging hammer according to the invention.

Fig. 3 is a transverse section, and

Figure 4:
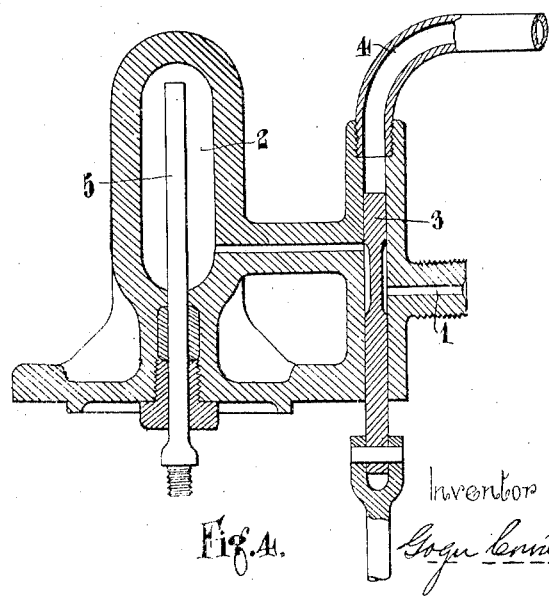

Fig. 4 a section on the line 4—4, Fig. 3, of a single acting engine constructed according to the invention.

Fig. 5 is a section showing a ratchet motor operated according to the invention suitable for starting motor car engines and like purposes.

Fig. 6 shows an expansion motor constructed according to the invention, while

Fig. 7 is a detail view of the automatic valve of this motor on an enlarged scale.

Fig. 8 shows a piercing tool constructed according to the invention.

Fig. 9 is a curve showing compressibility of water for different pressures.

Figure 1:
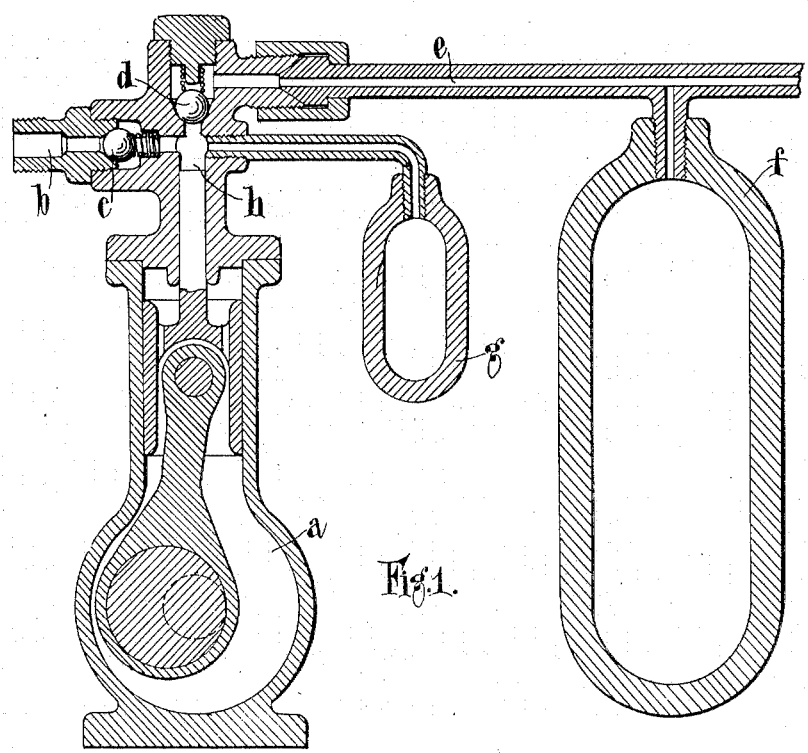
Figure 1 is a section through a pump and storage vessel constructed according to the invention.

In carrying the invention into effect as shown in Fig. 1, I employ an ordinary pump *a* pumping liquid from an inlet pipe *b* closed by a valve *c* through the valve *d* to a small bore pipe *e* leading to the strong vessel *f*. A small strong vessel *g* is provided in connection with the pumping cylinder *h*. The vessels *f* and *g* are completely full of liquid and the vessel *f* is of considerable volume relatively to the displacement of the pump *a* and this vessel being filled with liquid under high pressure will have stored in it a quantity of elastic energy given by the formula $$W = \frac{VH^2}{2E}$$

where W is the energy, V the volume of the compressed liquid in cubic centimeters, H the pressure of the liquid in kilograms per square centimeter, and E the co-efficient of elasticity of the liquid in kilograms per square centimeter. The energy so stored may be discharged instantaneously or gradually, and the discharging and charging may go on simultaneously, the rate of discharge being controlled at will without interference with the charging.

The energy may be utilized in different ways. According to the form of utilization shown in Fig. 2 the outlet from the vessel *f* may be connected up to a suitable valve *k* connected through a pipe *l* with a space *m* in the reciprocating mass *n* of a forging hammer. The return of the hammer may be effected by the use of a spring *o* acting on the return of the hammer, after striking the blow by the expansion of the liquid, the valve *k* may be moved to the position in which the liquid in the space *m* can escape by the discharge pipe *p*.

The operation of this hammer is as follows:—When it is desired to strike the blow, the valve *k* is moved to admit liquid from the reservoir *f* to the space *m* for a short time. The valve may then be closed and the expansion of the liquid in the space *m* will drive the hammer downward in a similar way to that in which the expansion of steam in a steam engine drives forward a piston. Work is thus performed by the expansion of the liquid and the hammer will acquire kinetic energy. On moving the valve to the exhaust position liquid will be discharged through the pipe *p* and the spring *o* will lift the hammer.

In Figs. 3 and 4 a single acting engine is illustrated operating in a similar manner to an ordinary steam expansion engine. The reservoir containing liquid under pressure is connected to the pipe *l* and the flow of liquid to the cylinder 2 is controlled by the valve 3 worked from an eccentric on the crank shaft in the usual steam engine manner. The exhaust from the cylinder 2 takes place through the exhaust pipe 4. The piston of the engine is formed as a rod 5 connected to a guide 6 which is connected to the crank by the connecting rod 7, thus driving the shaft 8. A suitable balance weight 9 may be provided. On admission of the pressure to the inlet pipe the engine will operate in a manner exactly analogous to that in which a steam engine operates. A suitable maximum pressure in the cylinder 2 would be about one thousand atmospheres.

The invention is specially applicable to machines requiring very high instantaneous forces, produced by a prime mover of small relative size. The energy of the prime mover may be accumulated as elastic energy by compressing the liquid in a suitable reservoir, and the energy thus accumulated may be utilized by a sudden discharge of the liquid behind the piston or other suitable device.

In the form of the invention shown in Fig. 5 the energy stored in the reservoir of compressed liquid is employed to operate a ratchet motor such, for instance, as can be used for starting motor car engines or stationary internal combustion engines, or like uses. In this motor the inlet 11 is connected to the reservoir containing compressed liquid through a three-way cock as shown in Fig. 2. The piston 12 is formed with a guide 13 at its lower end, which is connected by a rod to an oscillating arm 14 carrying a pawl 15 adapted to engage with a toothed wheel 16 on the shaft to be driven. A spring 17 is provided to return the piston to its upper position when the three-way cock is in the exhaust position. Any type of ratchet may be employed.

Figs. 6 and 7 show an expansion motor having an automatic valve and adapted to run in either direction. Liquid under very high pressure, for example oil at a pressure of 1,500 kilograms per square centimeter is admitted to the controlling valve 21 through the pipe 22 and the liquid discharged from the engine escapes by the pipe 23. The valve 21 controls the admission of the high pressure liquid to the cylinder 24 provided with a piston 25 connected to a guide 26 and to the engine crank shaft in the usual manner. When the piston 25 touches the projecting end 27 of the valve and compresses the spring 28, the high pressure valve 29 is opened and liquid from the high pressure pipe 22 passes into the cylinder 24, through apertures in the sides of the part 27. Immediately the piston 25 moves downward under the high pressure in the cylinder the valve 29 closes and the liquid in the cylinder 24 expands forcing the piston 25 downward until the pressure has dropped sufficiently to allow the coned valve 30 to open under the action of the spring 31. This should occur when the piston 25 has reached its lowest position. During the return of the piston 25 the valve 30 remains open and the liquid displaced is discharged through apertures 32 or a suitable discharge pipe 23. The piston in rising comes into contact again with the projecting end 27 of the valve and through the spring 28 closes the valve 30, the spring 28 being much stronger than the spring 31 to enable this to occur. After a short interval the piston again opens the high pressure valve 29 admitting the pressure so that the downward stroke of the piston is repeated. This motor can be run in either direction.

At starting, the high pressure line 22 must be shut off from the high pressure and open to atmosphere by a suitable three-way cock and under these conditions the flywheel of the motor can be rotated until the piston 25 opens the valve 29. By then turning on the pressure to the line 22 the motor would then start in one or the other direction according to which side of the dead point the connecting rod happens to be situated.

It will be seen that several energy utilizing devices can be worked from a single reservoir supplied by a single pump.

A safety device for a plunger pump may be constructed without the use of any safety valve. To effect this I place a vessel full of liquid in permanent communication with the cylinder of an ordinary hydraulic pump, the vessel being of such size that the displacement of the piston does not produce more than a certain predetermined pressure even if the delivery valve is closed. Such a device automatically insures the safety of the pump, as on the return stroke the pump cylinder is filled by the liquid expanding from the vessel and no fresh liquid will pass into the pump from the suction pipe. It follows, therefore, that if all the machines operating on the power line are shut off, the only energy expended by the prime mover is in overcoming friction; for instance, in Fig. 1 the vessel $g$ would operate in this manner if the outlet from the pump to the pipe $e$ were closed. The energy stored in the vessel during the outstroke of the piston will be returned to the piston on its instroke so that no loss of power occurs. The liquid employed may be water, oil, paraffin, alcohol, ether or other liquids, but I prefer to use lubricating oil in cases in which leakage is not likely to occur. Water may be employed in cases in which the exhaust liquid is not to be returned to the pump. Any liquid mixtures may be employed and thick grease or vaseline, or jellies, may be used in special cases.

Another example of the application of the invention is shown in Fig. 8. In this example a piercing tool is illustrated adapted to pierce a plate 41. The piercing tool 42 is formed on or attached to the end of a piston 43 working in a cylinder 44 to which high pressure liquid can be admitted through the valve 45, provided with discharge holes 32 as above described. No springs are provided to return the piston to its upper position and therefore the springs in the valve 45 should be relatively weak. An enlarged portion 47 is provided at the end of the piston to prevent this being shot right out of the bottom of the cylinder, which is formed with an annular tapered space 48 into which the projection 47 enters to check the piston at the end of its stroke. The piston is held in its upper position by a shearing pin 49 during the admission of the high pressure to the cylinder 44.

If desired an ordinary inlet valve may be used to which the pressure is led by a tube of very small bore. When the pressure in the cylinder 44 reaches a given value the pin 49 will be sheared and the piston will acquire kinetic energy owing to the expansion of liquid in the vessel 44, thus moving downward rapidly and causing the punching tool 42 to pierce the plate 41. The kinetic energy given to the piston carrying the tool produces a very high instantaneous pressure on the steel plate and piercing is readily effected. The plate may be held in position by any suitable means if required, but the relative size of the plate and the tool may be such that any supporting means may be dispensed with, the inertia of the plate being sufficient to allow piercing to be effected.

At the end of the stroke of the piston the small clearance between the enlarged portion of the piston and the space 48 will allow the kinetic energy remaining in the piston to be taken up in forcing liquid through the small clearance space. If desired a spring may be provided to bring the plunger back to the initial position as soon as the pressure in the cylinder has dropped, or the liquid may be trapped in an enlargement at the end of the space 48 and utilized to produce the recoil of the plunger to its original position.

Use will of course be made of the elasticity of the metal of the vessel to assist in the storage of energy but the percentage of elastic energy thus obtained is small in comparison with the energy stored in the liquid.

It will be seen that the storage vessel may be of any desired shape and if a number of different devices are operated from the same store of energy the necessary volume may be obtained by coupling several vessels together by means of strong tubes.

It should be noted that some liquids have a very small co-efficient of elasticity when heated to certain temperatures. It should be noted also that the smaller the co-efficient of elasticity of a liquid, the greater is the quantity of energy which can be stored in a given volume at the same pressure. For example, the ethyl alcohol, the co-efficient of elasticity for pressures of about 200 kilograms per square centimeter at about 28° C. is 12,000 kilograms per square centimeter approximately, while at a temperature of 310° C. the co-efficient of elasticity is 240 kilograms per square centimeter, so that much more energy can be stored at the higher temperature. The reverse is the case with water, which has a higher co-efficient of elasticity at a high temperature. The curve at Fig. 9 shows the extent to which the volume of water is contracted under different pressures at constant normal temperature.

It should be noticed that the co-efficient of elasticity of water and other liquids does not vary appreciably when gases are in solution in the liquid in small proportion, and such gases in solution produce little effect.

The invention may be applied to the storage of energy in a manner analogous to the storage of energy in electric accumulators. For instance, a volume of liquid may be compressed to a pressure of say 500 kilograms per square centimeter, and the energy may be utilized in reducing the pressure to say 400 kilograms per square centimeter. The energy so obtained can be used for actually specially-designed motors, hammers and the like, while the strong vessel after the pressure has dropped to 400 kilograms per square centimeter can be recharged to a pressure of 500 kilograms per square centimeter. If a suitable liquid is used, the compression and expansion are practically isothermal, and the efficiency of the storage plant would be extremely high, much higher than the efficiency of storage of energy by compressed air.

What I claim as new and desire to secure by Letters Patent is:

1. The method of translating energy which consists in converting kinetic energy into elastic energy by compressing a body of liquid as to volume while retaining it in liquid form, and then reconverting the elastic energy into kinetic energy by releasing said liquid for the performance of useful work as by subjecting a liquid actuated implement to the expansive force of said liquid.

2. A system for utilizing the expansive force of a body of liquid compressed as to volume comprising: a chamber containing liquid compressed as to volume, a container for a body of liquid of normal volume, means for releasing the compressed liquid from the chamber into the container, and means for actuating an implement by the expansion of the compressed liquid introduced into the chamber.

3. A system for utilizing the expansive force of a body of liquid compressed as to volume comprising: a chamber containing liquid compressed as to volume, a container for a body of liquid of normal volume, means for releasing the compressed liquid from the chamber into the container, and a reciprocating plunger, of an implement to be operated, immersed in the body of liquid in the container.

4. A system for accumulating and utilizing energy by compressing a liquid to a volume less than its original volume comprising: a pump, a strong vessel completely filled with liquid connected with said pump, a unidirectional valve between said pump and said vessel to admit of flow of liquid from the former to the latter, a second strong vessel also completely filled with liquid of smaller size than the first vessel and in free communication with said pump, a unidirectional inlet valve for said pump, and means, including a piston, actuated by volume expansion of liquid from said first mentioned strong vessel.

5. A system for accumulating and utilizing energy comprising: means for converting kinetic energy into elastic energy including means for reducing a body of liquid into a static volume less than normal while retaining it in liquid form, and means for reconverting the elastic energy into kinetic energy including means for releasing said liquid and subjecting a liquid actuated implement to the expansive force of said liquid.

In testimony whereof I have signed my name to this specification.

GOGU CONSTANTINESCO.